(12) United States Patent
Ochi

(10) Patent No.: US 9,304,734 B2
(45) Date of Patent: Apr. 5, 2016

(54) MUSIC SYSTEM CONTROL METHOD

(71) Applicant: Yamaha Corporation, Hamamatsu-Shi, Shizuoka-Ken (JP)

(72) Inventor: Mitsunori Ochi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 334 days.

(21) Appl. No.: 14/070,162

(22) Filed: Nov. 1, 2013

(65) Prior Publication Data

US 2014/0129012 A1 May 8, 2014

(30) Foreign Application Priority Data

Nov. 2, 2012 (JP) ................... 2012-242377

(51) Int. Cl.

| | |
|---|---|
| *G06F 17/00* | (2006.01) |
| *G06F 3/16* | (2006.01) |
| *H04L 29/08* | (2006.01) |
| *H04L 12/26* | (2006.01) |
| *H04H 60/04* | (2008.01) |
| *H04L 12/28* | (2006.01) |

(Continued)

(52) U.S. Cl.
CPC ............... *G06F 3/165* (2013.01); *G06F 3/048* (2013.01); *H04H 60/04* (2013.01); *H04L 12/282* (2013.01); *H04L 43/10* (2013.01); *H04L 67/125* (2013.01); *H04N 21/43615* (2013.01); *H04L 12/18* (2013.01)

(58) Field of Classification Search
CPC .......... G10H 2240/305; G10H 1/0058; H04L 43/10; H04L 67/125; H04L 29/08846; H04L 67/14

See application file for complete search history.

(56) References Cited

U.S. PATENT DOCUMENTS 7,620,468 B2 * 11/2009 Shimizu ................. H04H 60/04
381/119
2006/0259631 A1 11/2006 Gargi (Continued)

FOREIGN PATENT DOCUMENTS

| EP | 1 589 698 A1 | 10/2005 |
|---|---|---|
| JP | 2011/059232 A | 3/2011 |
| WO | WO-02/21414 A1 | 3/2002 |

OTHER PUBLICATIONS

Euphonix, Inc. (2008). "MC Mix Professional Control Surface User Guide," Music, Audio Post Video, Film, Euphonix, Artist Series, Palo Alto, CA, 96 pages.

(Continued)

*Primary Examiner* — Curtis Kuntz
*Assistant Examiner* — Thomas Maung
(74) *Attorney, Agent, or Firm* — Morrison & Foerster LLP

(57) ABSTRACT

Each of DAW processes and UI devices which are controllers of the DAW processes regularly sends a heartbeat signal including identification information of a music system which the DAW process or UI device belongs to, to a network by broadcast or multicast. The heart beat signal can be transmitted to the network using an Ethernet frame for UDP including the heartbeat signal in the data body, as a heartbeat packet. Based on the received heartbeat signal, it can be distinguished that the DAW process or UI device which sent the heartbeat signal is which of a device or music software process belonging to the relevant music system, a device or music software process belonging to another music system, and a device or music software process not belonging to any music system.

4 Claims, 11 Drawing Sheets

(51) Int. Cl.
 *H04N 21/436* (2011.01)
 *G06F 3/048* (2013.01)
 *H04L 12/18* (2006.01)

(56) References Cited

U.S. PATENT DOCUMENTS

2007/0260690 A1* 11/2007 Coleman .............. G10H 1/0058
 709/205
2009/0307395 A1* 12/2009 Umeo .................... G08C 19/00
 710/61

OTHER PUBLICATIONS

Euphonix. (Aug. 2, 2009). "MC Mix Professional Control Surface User Guide," Music, Audio Post Video, Film, Euphonix, Artist Series, Palo Alto, CA, Retrieved from the Internet: URL:https://web.archive.org/web/20090824051 18/http://connect.euphonicx.com/documents/MC_Mix_User_Guide_rD_Eng.pdf, retrieved on Jan. 31, 2014, Document Revision, 50 pages.

European Search Report dated Mar. 7, 2014, for EP Application No. 13190769.3, ten pages.

* cited by examiner

SETTINGS OF WORKGROUPS

MANAGEMENT SESSION AND INTERRUPT SESSION

CONTROL SESSION

Fig. 9

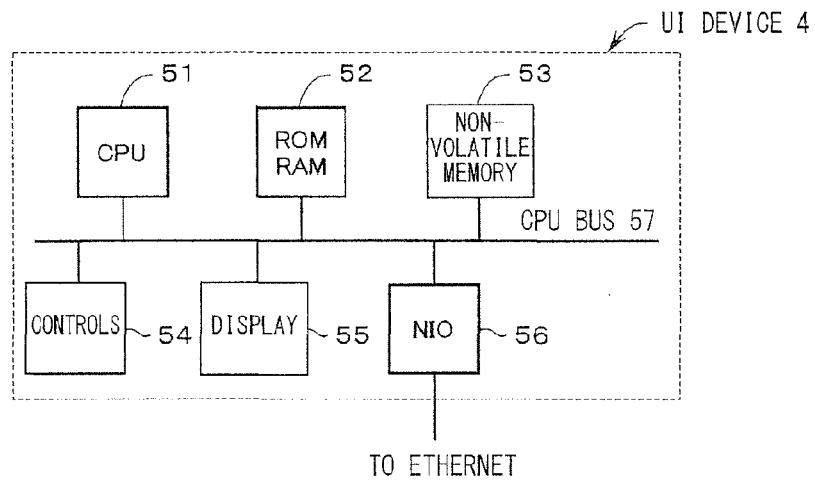

Fig. 10A

ETHERNET FRAME (TCP)

| EN HEADER 14 BYTES | IP HEADER 20 BYTES | TCP HEADER 20 BYTES | DATA BODY (MANAGEMENT/CONTROL/INTERRUPT PACKET) | C |

Fig. 10B  MANAGEMENT PACKET

| MANAGEMENT HEADER | MANAGEMENT MESSAGE | C |

Fig. 10C  CONTROL PACKET

| CONTROL HEADER | CONTROL MESSAGE | C |

Fig. 10D  INTERRUPT PACKET

| INTERRUPT HEADER | INTERRUPT MESSAGE | C |

{Fig. 10E}

ETHERNET FRAME (UDP)

| EN HEADER 14 BYTES | IP HEADER 20 BYTES | UDP HEADER 8 BYTES | DATA BODY (HEARTBEAT PACKET) | C |

{Fig. 10F}  HEARTBEAT PACKET

| HB HEADER | HB MESSAGE | C |

MUSIC SYSTEM CONTROL METHOD

TECHNICAL FIELD

The invention relates to a music system control method for controlling a plurality of devices and processes connected one another via a network so as to make some of the devices and some of the music software processes operate as one music system.

BACKGROUND ART

It has been conventionally known to use a computer to perform audio signal processing operations such as recording, editing, mixing, and the like of performance data. The computer is a general purpose computer such as PC (personal computer) and has various hardware devices such as an audio interface and a MIDI (Musical Instrument Digital Interface) I/F, and music software is installed thereon. Application software called DAW (Digital Audio Workstation) is known as conventional music software to be installed on the PC. A PC on which a DAW process is activated functions as a music processing device and is able to execute music processing such as recording/reproducing, editing, and mixing of MIDI data and audio signals.

Functions of the music software of DAW which runs on a PC are plentiful, and installing the music software on a PC enables an individual person to easily create music. On the other hand, functions of the music software has become abundant, and they are complicated to operate when performing all operations of music software (DAW) processes activated on the PC or setting parameters thereof with a mouse or a keyboard of the PC. Accordingly, on advanced scenes of creating music, a physical controller for operating music software processes is connected to the PC on which the music software is installed, and controls such as knobs, sliders, and buttons provided on this physical controller are used to perform operations and setting of parameters when performing recording/reproduction, editing, mixing of performance data and audio data (see PTL1).

Further, there is known a music system in which a plurality of PCs on which the music software is installed are connected to a network, and a controller for controlling respective music software processes activated on the PCs is connected through the network. In this music system, a process (management software process) which manages connection between the controller and a DAW process is activated together with the DAW process on each PC. Then, in response to operation of a switch for switching connection on an operating panel of the controller, the controller switches a music software process to be a subject of the control (see NPL1).

CITATION LIST

Patent Literature

{PTL1} JP 2011-59232 A

Non Patent Literature

{NPL1} Mc Mix User's Operation Guide Manual (Japanese), pp. 11-18, pp. 38-42, [online], [retrieved on Apr. 3, 2012], the Internet <http://connect.euphonix.com/documents/MC_Mix_User_Guide_rB_Jap.pdf>

SUMMARY OF INVENTION

Technical Problem

In a conventional music system in which a plurality of PCs on which music software is installed are connected to a network, and a plurality of controllers for operating music software processes activated on the PCs are connected to the network, it is uneasy to allow coexistence of plural music systems on one network. Further, each music system communicates with all the processes and devices (controllers) on the network to recognize processes and devices existing thereon, and makes an inquiry about which music system they belong to. Thus, there have been problems that the communication band of the network is compressed, and an excessive load is given to a control CPU of each device which is generally low in processing performance compared to PCs.

Accordingly, it is an object of the present invention to provide a music system control method which does not compress a communication band of a network and does not give an excessive load to a control CPU of each device even when plural music systems coexist on one network.

Solution to Problem

To attain the object, a music system control method of the invention is a music system control method for controlling a plurality of devices and a plurality of music software processes connected one another via a network so as to make some of the music software processes and some of the controllers operate as one music system, including: a first step of receiving a heartbeat signal regularly transmitted from each of the plurality of devices and the plurality of music software processes by broadcast or multicast, the heartbeat signal including identification information of a music system which the device or music software processes which sent the heartbeat signal belongs to; a second step of presenting, based on the heartbeat signal received in the first step, each of the devices and the music software processes which sent the heartbeat signal such that it is possible for a user to determine that the device or music software process belongs to any music system or not; a third step of accepting, from a user, selection of a device or music software process among the device or music software process not belonging to any music system presented in the second step, and registering the selected device or music software process as a device or music software process belonging to the one music system; and a fourth step of accepting, from a user, operation to the one music system, and controlling the device or music software process belonging to the one music system according to the accepted operation.

In such a music system managing method, it is conceivable that the heartbeat signal regularly transmitted from each of the plurality of devices and the plurality of music software processes by broadcast or multicast including a port number for communicating with the device or music software process which sent the heartbeat signal, and the controlling in the fourth step is remote controlling through communication with the device or music software process using the port number included in the heartbeat signal transmitted from the device or music software process.

It is also conceivable that the heartbeat signal regularly transmitted from each of the plurality of devices and the plurality of music software processes by broadcast or multicast including the identification information of the music system which the device or music software processes which sent the heartbeat signal belongs to, and a status data indicating whether a remote control is active or inactive regarding the music system, and the presenting in the second step is presenting, based on the identification information of the music system and the status data included in the heartbeat signal received in the first step, each of the devices and the music software processes which sent the heartbeat signal.

In the above music system managing methods, it is also conceivable that the second step is presenting, based on the heartbeat signal received in the first step, each of the devices and the music software processes which sent the heartbeat signal such that it is possible for a user to determine that the device or music software process is which of a device or music software process belonging to the one music system, and a device or music software process belonging to another music system, and the third step is accepting, from a user, selection of a device or music software process among the device or music software process belonging to another music system presented in the second step, intercepting the selected device or music software process from the another music system, and registering the selected device or music software process as a device or music software process belonging to the one music system.

The above and other objects, features and advantages of the invention will be apparent from the following detailed description which is to be read in conjunction with the accompanying drawings.

Advantageous Effects of Invention

In a music system control method of the invention, regardless of whether each device or music software process belongs to a relevant music system or not, a heartbeat signal multicasted or broadcasted from the device or music software process is received regularly, so as to confirm existence of the device or music software process. Moreover, not only existence of each device or music software process on a relevant network, but also whether each device or music software process belongs to the relevant music system or not and whether each device or music software process belongs to another music system or not are determined by this heartbeat signal and presented to the user of the relevant music system. Thus, the user can select a member of this system from music software processes and devices which do not belong to any system. Specifically, an exclusive music system can be constructed easily. Further, since each music software process or device just needs to multicast or broadcast one heartbeat signal regularly, the communication band of the network is not compressed so much, and the load on the CPU of each device can be suppressed relatively low.

Further, in another music system control method of the present invention, remote control of each device using a port number specified by the heartbeat signal in each device can be realized.

Moreover, in another music system control method of the present invention, a device or music software process belonging to another music system can be intercepted and registered.

Furthermore, in another music system control method of the present invention, based on system identification information and status data in a heartbeat signal received from each device or music software process, this device or music software process can be presented such that it is possible to determine that this device or music software process is which of a device or music software process belonging to the relevant music system, a device or music software process belonging to another music system, and a device or music software process not belonging to any music system.

BRIEF DESCRIPTION OF DRAWINGS

FIG. 9 is a block diagram illustrating a hardware structure of a UI device in the music system control method of the embodiment of the invention.

FIG. 10A is a block diagram illustrating a structure of an Ethernet frame in the music system control method of the embodiment of the invention.

FIG. 10B is a block diagram illustrating a structure of a management packet illustrated in FIG. 10A.

FIG. 10C is a block diagram illustrating a structure of a control packet illustrated in FIG. 10A.

FIG. 10D is a block diagram illustrating a structure of an interrupt packet illustrated in FIG. 10A.

FIG. 10E is a block diagram illustrating a structure of another Ethernet frame in the music system control method of the embodiment of the invention.

FIG. 10F is a block diagram illustrating a structure of a heartbeat packet illustrated in FIG. 10E.

DESCRIPTION OF EMBODIMENTS

Figure 1:
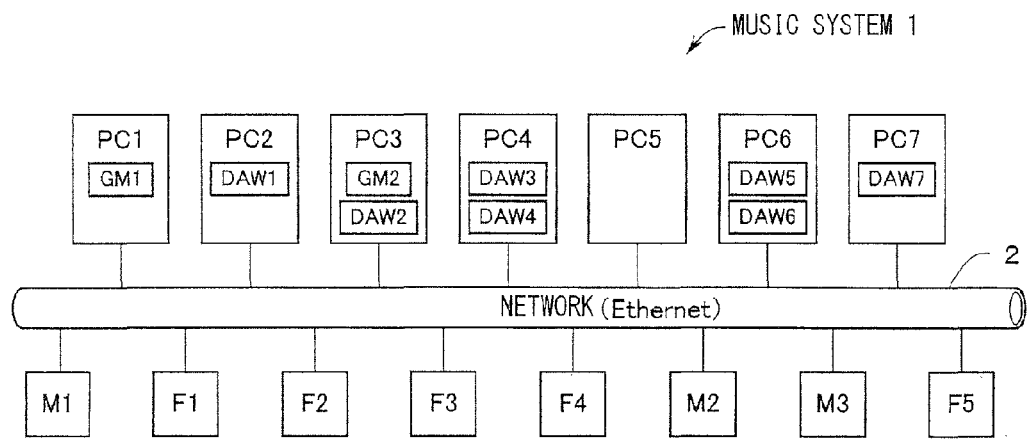
FIG. 1 is a block diagram illustrating a hardware structure of a music system to which a music system control method of an embodiment of the invention is applied.

FIG. 1 illustrates a block diagram illustrating a structure of a music system to which a music system control method of an embodiment of the invention is applied.

A music system 1 includes a network 2 of Ethernet (trademark), and seven personal computers (PC) PC1, PC2, PC3, PC4, PC5, PC6 and PC7 and eight UI (user interface) devices M1, F1, F2, F3, F4, M2, M3 and F5 are connected to the network 2. Ethernet is the name of a network technology standard for LAN (local area network). To each of the seven PCs and eight UI devices connected to the network 2, at the time it is newly connected to the network 2, an IP address different from one another is assigned from a DHCP (Dynamic Host Configuration Protocol) server connected already to the network 2. In this case, a dedicated DHCP server may be provided, or either one PC or UI device may assume the role of the DHCP server. Note that it is also possible to set static IP addresses in advance to the seven PCs and eights UI devices. On the seven personal computers, management software processes and/or music software (DAW) processes are activated on an OS (Operating System), and a management software process GM1 is activated on PC1, a DAW process DAW1 is activated on PC2, a management software process GM2 and a DAW process DAW2 are activated on PC3, two DAW processes DAW3, DAW4 are activated on PC4, two DAW processes DAW5, DAW6 are activated on PC6, and a DAW process DAW7 is activated on PC7. On a PC on which a DAW process is activated, music processing such as recording/reproduction, editing, and mixing of a MIDI event or an audio signal can be executed. Note that in the present specification, a group of processes for making PCs serve the function as one DAW (Digital Audio Workstation) in cooperation are called "DAW processes", and a group of processes for making PCs serve the function as one music system managing device in cooperation are called "management software processes". Further, each of M1, F1, F2, F3, F4, M2, M3 and F5 as UI devices is a physical controller having knobs, faders, buttons, and/or the like to be operated by the user, and M1, M2, M3 are main controllers and F1, F2, F3, F4, F5 are fader controllers.

Each of the UI devices, the DAW processes, and the management software processes in the music system 1 illustrated in FIG. 1 is given a unique ID for identifying this UI device or process. This unique ID does not change upon activation or stop of the UI device or process. Therefore, when the UI device or process is found on the network by a heartbeat packet which will be described later, the unique ID can be used to judge whether or not the same UI device or process is listed on an HB list which will be described later.

Note that the DAW process is configured such that the user can create any numbers of MIDI tracks recording a MIDI event, audio tracks recording an audio signal, and buses mixing the audio signals, regarding each music file called a project. The audio tracks can record, selectively in each audio track, an audio signal inputted from one or more input ports/channels which the DAW process has, and as an output destination of the audio signal reproduced on the audio track, any one of plural output ports/channels which the DAW process has can be selected. Then, every time the user creates an audio track, a display section of a corresponding channel strip is added to a mixer screen. Note that in the channel strip of the mixer screen, parameters of various channels are adjusted, and details of an audio channel among them will be described later with reference to FIG. 8.

Figure 2:
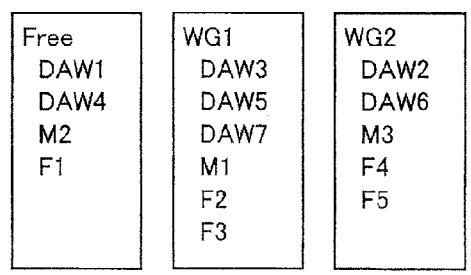
FIG. 2 is a diagram of an example of settings of workgroups in the music system control method of the embodiment of the invention.

Each of the management software process GM1 activated on PC1 and the management software process GM2 activated on PC3 manages a workgroup provided regarding the management software process, and DAW processes and UI devices existing on the network 2 can be registered in the workgroup. An example of settings of the workgroups is illustrated in FIG. 2, in which the DAW processes DAW3, DAW5 and DAW7, and the UI devices M1, F2 and F3 are registered in a workgroup WG1, the DAW processes DAW2 and DAW6, and the UI devices M3, F4 and F5 are registered in a workgroup WG2, and DAW1, DAW4, M2 and F1 are not registered in either of the workgroups. The management software process GM1 manages the workgroup WG1, and the management software process GM2 manages the workgroup WG2. Note that a workgroup is managed on the PC on which the management software process corresponding to this workgroup is executed. The DAW processes and the UI devices included in one workgroup operate as one music system. Specifically, in the case illustrated in FIG. 2, a first music system corresponding to the workgroup WG1 and a second music system corresponding to the workgroup WG2 operate independently. In each music system, music processing such as recording/reproduction, editing, and mixing of an inputted MIDI event or audio signal can be executed. Note that in management of the workgroups, communication between members which are DAWs and UI devices constituting the workgroup is managed, and addition or deletion of members is managed, which will be described in detail later.

Figure 5:
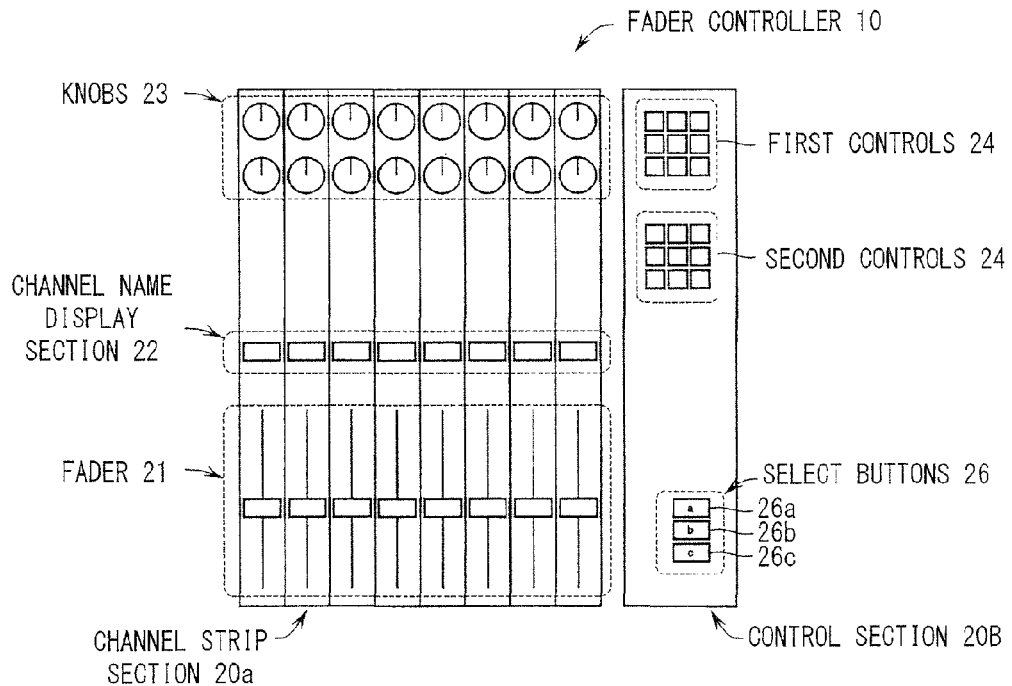
FIG. 5 is a view illustrating a panel structure of a fader controller in the music system control method of the embodiment of the invention.

Here, FIG. 5 illustrates a panel structure of a fader controller 10 denoted by F1, F2, F3, F4 and F5.

As illustrated in FIG. 5, on the panel of the fader controller 10, there are provided a channel strip section 20a constituted of plural, eight for example, channel strips and a control section 20b. On each channel strip of the channel strip section 20a, one channel strip in the mixer screen is assigned, and controls for instructing adjustment of the assigned channel strip is provided. The controls are a fader 21, plural knobs 23, and the like, and a name of a control target channel assigned to this channel strip can be displayed on a channel name display section 22. Then the level of the control target channel can be adjusted by operating the fader 21, and predetermined parameters of the control target channel can be adjusted by operating the knobs 23.

Further, in the control section 20b, first controls 24, second controls 25, and select buttons 26 are provided, which are groups of controls for performing an operation which cannot be performed in the channel strip section 20a. The first controls 24 are for switching an item of a parameter to be assigned to knobs 23 in the channel strip section 20a, and the second controls 25 are for switching the control target channel to be assigned to each channel strip of the channel strip section 20a. Further, the select buttons 26 are for switching the DAW process as a target of control, in which pressing a button 26a labeled "a" switches the target of control to a DAW process assigned to "a", pressing a button 26b labeled "b" switches the target of control to a DAW process assigned to "b", and pressing a button 26c labeled "c" switches the target of control to a DAW process assigned to "c".

As described above, when one of the select buttons 26a to 26c is operated and thereby one DAW process corresponding to the operated select button is selected as the target of control, a control session is established between the relevant UI device and the PC executing the selected DAW process. Moreover, among the select buttons 26*a* to 26*c*, the select button corresponding to the DAW process for which the control session is established lights up, and the select buttons corresponding to the DAW processes to which the control session is not established light down. Thus, the user can recognize the DAW process currently controlled by the relevant UI device by checking the state of light up/light down of the select buttons 26*a* to 26*c*.

Note that when any of the DAW processes is added to the workgroup, one of "a", "b", and "c" which is not assigned to an existing DAW process at that time is assigned to the newly added DAW process.

Figure 6:
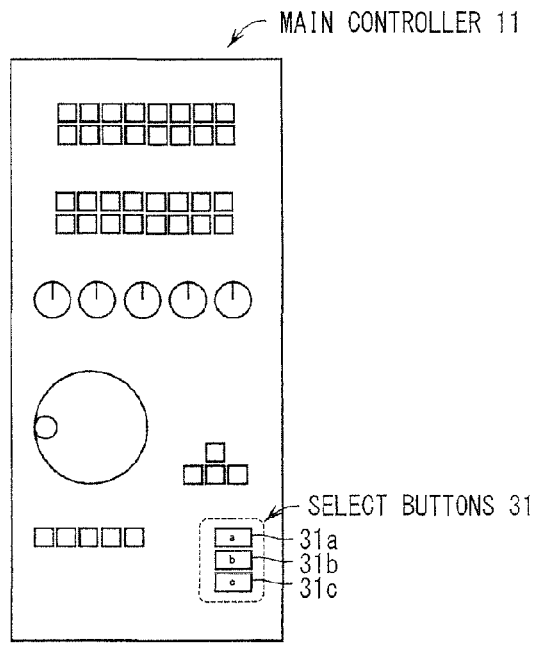
FIG. 6 is a view illustrating a panel structure of a main controller in the music system control method of the embodiment of the invention.

Next, FIG. 6 illustrates a panel structure of a main controller 11 denoted by M1, M2 and M3.

The main controller 11 is a controller for controlling a transport, detailed parameters of each channel, and the like, and the channel strip section is not provided on a panel of the main controller 11 as illustrated in FIG. 6. On the panel of the main controller 11, plural controls are provided such as knobs and buttons for controlling a transport, detailed parameters of each channel, and the like. Typically, plural controls for performing various operations on a main screen of the DAW process are disposed on the panel. Specifically, there are disposed "plural buttons for opening various pop-up screens for controlling detailed parameters of the DAW process", "controls for changing a position of a time cursor indicating the current time on a track", "controls for instructing start/stop of recording and start/stop of reproduction", "controls for setting a value to a parameter at a cursor position", "controls for storing/recalling a parameter set to a library", and the like. Further, select buttons 31 for switching a DAW process as the target of control are provided, in which pressing a button 31*a* labeled "a" switches the target of control to the DAW process assigned to "a", pressing a button 31*b* labeled "b" switches the target of control to the DAW process assigned to "b", and pressing a button 31*c* labeled "c" switches the target of control to the DAW process assigned to "c".

Further, the controls of the channel strip section 20*a* and the control section 20*b* of the fader controller 10 and the controls of the main controller 11 are used to adjust various setting in the DAW process as the target of control. In this case, control is performed by sending control information according to an amount of operation on a control to the DAW process (PC) as the target of control.

Figure 3:
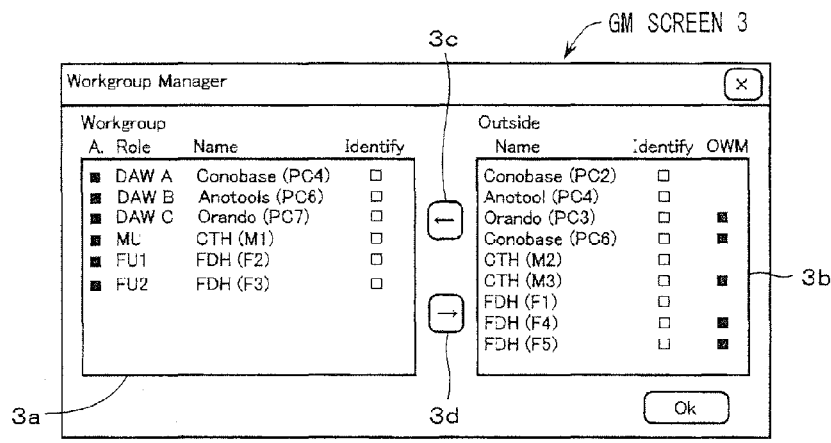
FIG. 3 is a view illustrating a group manager screen in the music system control method of the embodiment of the invention.

Setting of workgroups as illustrated in FIG. 2 can be performed in a group manager (GM) screen 3 illustrated in FIG. 3. This GM screen is displayed on a display device of the PC on which the management software (GM) process is activated. The example of the GM screen 3 illustrated in FIG. 3 is displayed on the display device of PC1 on which the GM1 process is activated.

On the GM screen 3, a "Workgroup" section 3*a* displays UI devices and DAW processes which are members registered in the workgroup WG1 managed by the GM1 process and exist on the network 2. Further, an "Outside" section 3*b* displays DAW processes and UI devices which are not registered in the workgroup WG1 but exist on the network 2.

Here, among names displayed in the section 3*a* and section 3*b*, names "Conobase", "Anotool", "Orando", "CTH", and "FDH" are model names of respective DAW processes or UI devices, and are displayed corresponding to model IDs included in HB messages, which will be described later, received from these DAW processes or these UI devices. Further, roles "DAW A", "DAW B", and "DAW C" indicate assignments of roles of first DAW ("a"), second DAW ("b"), and third DAW ("c") of the relevant workgroup to the DAW process. A role "MU" indicates an assignment of the role of a first main controller of this workgroup to the main controller 11, and roles "FU1", "FU2" respectively indicate assignments of the roles of a first and a second fader controller of this workgroup to the fader controller 10. Note that these "roles" are "roles" assigned in CPU processing of the management software process when these DAW processes or UI devices are registered in this workgroup as new members.

In this case, even when a DAW process or UI device is registered in another workgroup, a model name thereof is displayed on the "Outside" section 3*b* when the DAW process or UI device exists on the network 2. In the illustrated case, the DAW processes named "Conobase (PC2)", "Anotools (PC4)", "Orando (PC3)" and "Conobase (PC6)", and the UI devices named "CTH (M2)", "CTH (M3)", "FDH (F3)", "FDH (F4)" and "FDH (F5)" exist on the network 2 and are displayed on the "Outside" section 3*b*.

Column OWM in section 3*b* stands for "Other Workgroup Member", and a black square therefore means that the DAW process or UI device is a member of another workgroup (other being not the one displayed in the section 3*a*). No square means that the DAW process or UI device is not assigned to (does not belong to) any workgroup. FIG. 3 matches with FIG. 4*a*, that is, "Conbase (PC2)" equals DAW1, "Anotool (PC4)" equals DAW4, "Orando (PC3)" equals DAW2, and "Conbase (PC6)" equals DAW6. Further, "CTH (M2)", "CTH (M3)", "FDH (F1)", "FDH (F4)" and "FDH (F5)" equal to M2, M3, F1, F4 and F5, respectively.

Moreover, a left arrow button 3*c* is a button for adding a member to the workgroup (WG1 in this case), and by selecting a member desired to be added from the "Outside" section 3*b* and clicking the left arrow button 3*c*, the user can add the selected member to WG1. In this case, the added member is erased from the "Outside" section 3*b* and is displayed on the "Workgroup" section 3*a*. Further, a right arrow button 3*d* is a button for deleting a member registered in WG1, and by selecting a member desired to be deleted in the "Workgroup" section 3*a* and clicking the right arrow button 3*d*, the user can delete the selected member from WG1. In this case, the deleted member is erased from the "Workgroup" section 3*a* and is displayed on the "Outside" section 3*b*.

Figure 4A:
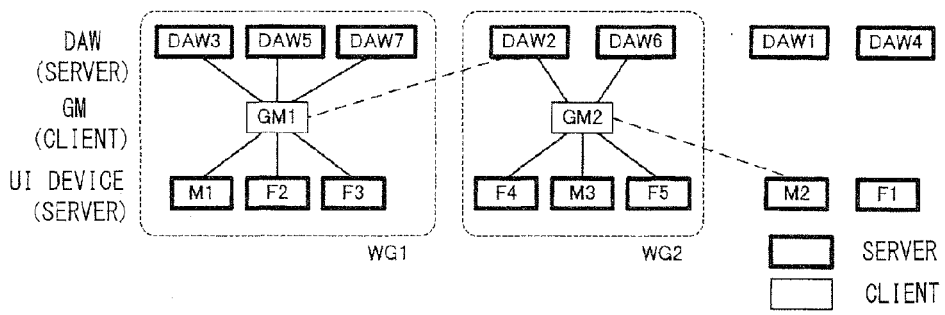
FIG. 4A is a diagram illustrating an example of sessions established in the music system control method of the embodiment of the invention.

In the music system control method according to the embodiment, a management session is constantly established for communication between a management software process and respective members in the workgroup operating as the music system managed by the management software process. Further, in the workgroup managed by the management software process, an interrupt session is established temporarily when communication is performed temporarily between the management software process and the members. FIG. 4A illustrates an example of the management sessions and the interrupt sessions established in workgroups. As illustrated in FIG. 4A, in WG1 operating as the music system managed by GM1, GM1 establishes, as a client of management sessions, six management sessions indicated by solid lines with the DAW processes DAW3, DAW5 and DAW7, and the UI devices M1, F2 and F3 each operating as a server. Moreover, GM1 temporarily establishes an interrupt session as necessary with other DAW processes or UI devices operating as a server. Further, in WG2 managed by GM2 and operating as a music system different from WG1, GM2 establishes, as a client of management sessions, five management sessions indicated by solid lines with the DAW processes DAW2 and DAW6, and the UI devices F4, M3 and F5 each operating as a server. Moreover, GM2 temporarily establishes an interrupt session as necessary with other DAW processes or UI devices operating as a server.

Here, "establishing a session" in the music system 1 according to the embodiment refers to establishing a logical communication path (TCP connection) from a PC executing a management software process or a UI device, as a client, to a UI device or a PC executing a DAW process, as a server, on the network 2, and assigning this established path to a session (exchange of data) between this client and this server. There are three types of sessions, "management session", "interrupt session", and "control session", and exchange of data according to the type of session is performed. Further, "releasing a session" in the music system 1 according to the embodiment refers to releasing the communication path (TCP connection) assigned to this session.

The management session is established with a member when GM1 or GM2 receives a first heartbeat packet, which will be described later, from a member of its own workgroup after the management software process is activated on the PC, or is established with a new member when this member newly joins the workgroup. Further, the management session is kept established while the music system is in operation, but when a member is deleted from the workgroup, the management session with this member is released. For example, when DAW2 is added to WG1, the management session between the DAW2 process and GM2 is released, and a management session is established between GM1 and the DAW2 process. Moreover, when M2 is added to WG2, there is no management session to be released since M2 is not registered in either of the workgroups, and a management session is established between GM2 and M2. Note that when a server receives a connection instruction of management session from one of clients when there is no management session established, and when a server receives a connection instruction of interrupt session from one of clients when there is no interrupt session established, the server establishes a session for which the connection instruction is given. However, when the server receives a connection instruction of management session from one of clients when there is an established management session, and when a server receives a connection instruction of interrupt session from one of clients when there is an established interrupt session, the server refuses the connection instruction. Further, when plural DAW processes are activated on one PC, the DAW processes listen with port numbers different from each other. In this case, the plural PCs and the plural UI devices on the network 2 can be identified with their respective assigned IP addresses, and thus each management software process can identify one of the DAW processes or the UI devices with a combination (socket) of the IP address and the port number of the partner.

Figure 15:
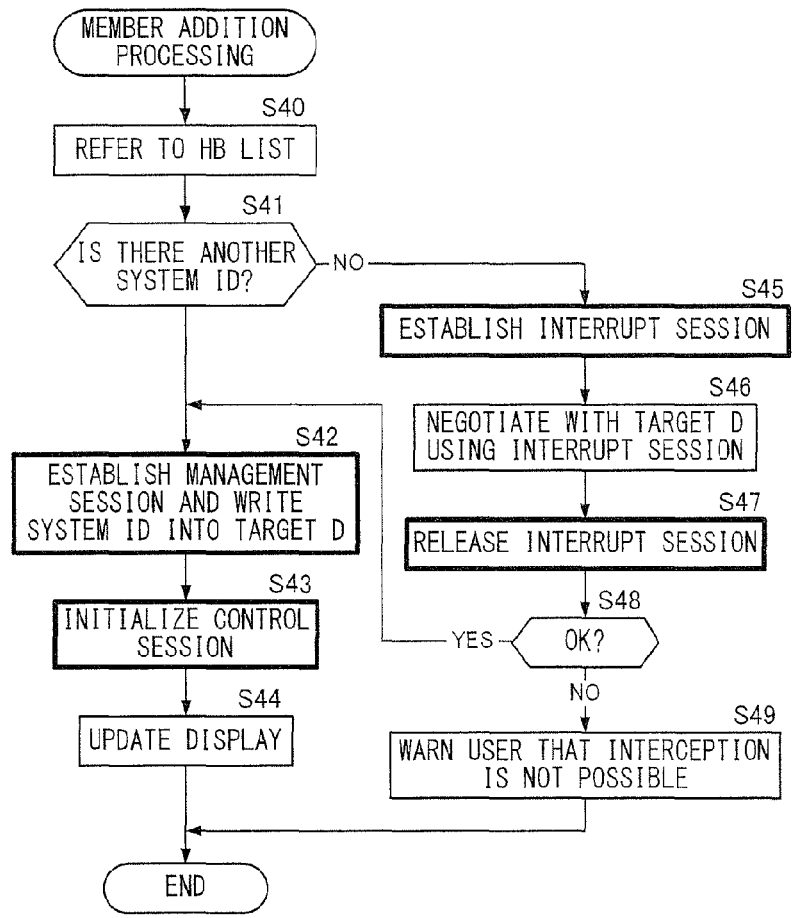
FIG. 15 is a flowchart of member addition processing in the music system control method of the embodiment of the invention.

Further, the interrupt session is established temporarily with a server (DAW process or UI device) to be a new member when the left arrow button 3c is operated on the above-described GM screen 3. For example, as indicated by dashed lines in FIG. 4A, an interrupt session is established between GM1 and the DAW2 process, and an interrupt session is established between GM2 and M2. A client (GM) uses an established interrupt session to negotiate with a server to be a new member, and releases the interrupt session when the negotiation is finished. Here, when the negotiation succeeds, the management session is established with the server and this server is added as a new member, but when the negotiation fails, the management session is not established with this server and this server is not added as a new member. Specific conditions for the success of negotiation will be described in relation with step S46 of member addition processing (FIG. 15), which will be described later.

Moreover, in the above-described GM screen 3, when "□" in an "Identify" section in either the "Workgroup" section 3a or the "Outside" section 3b is clicked, the management software process establishes an interrupt session temporarily with the DAW process or UI device corresponding to this "□" in the "Identify" section. Then, the management software process sends, via the interrupt session, a confirmation message to the DAW process or UI device with which the interrupt session is established, and the DAW process or UI device which received this confirmation message notifies the user that itself is the DAW process or UI device corresponding the clicked "□". The method of notification may be, for example, flashing at least one window under control of the DAW process, changing brightness and/or color of at least one lamp on a window of the DAW process or the panel of the UI device, or blinking this lamp, or the like.

Figure 4B:
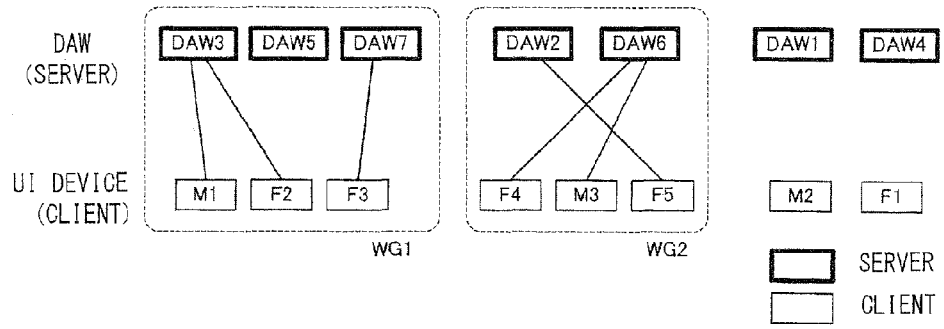
FIG. 4B is a diagram illustrating another example of the sessions.

Furthermore, in the music system control method according to the embodiment, the control session is constantly established for communication between a DAW process in a workgroup and a UI device controlling this DAW process. FIG. 4B illustrates an example of the control sessions established in workgroups. As illustrated in FIG. 4B, in WG1 operating as the music system managed by GM1, control sessions are established between each of the UI devices M1, F2 and F3 as a client and one of the DAW processes DAW3, DAW5 and DAW7 as a server. Each DAW process has the established control sessions with an arbitrary number of UI devices. Specifically, the control sessions are established between the DAW3 process, and M1 and F2 respectively, as indicated by solid lines, and the user can remotely control operation of the DAW3 process via these control sessions by operating M1 and F2. Further, the control session is established between the DAW7 process and F3 as indicated by a solid line, and the user can remotely control operation of the DAW7 process via this control session by operating F3. Moreover, in WG2 operating as the music system managed by GM2, the control session is established between each of the UI devices F4, M3 and F5 as a client and one of the DAW processes DAW2 and DAW6 as a server. Each DAW process has the established control sessions with an arbitrary number of UI devices. Specifically, the control session is established between the DAW2 process and F5 as indicated by a solid line, and the user can remotely control operation of the DAW2 process via this control session by operating F5. Further, the control sessions are established between the DAW6 process, and F4 and M3 respectively, as indicated by solid lines, and the user can remotely control operation of the DAW6 process via these control sessions by operating F4 and M3.

Note that when plural DAW processes are activated on one PC, each DAW process uses a unique port number in this PC. Thus, in this PC, it is possible to determine to which DAW process a control packet should be delivered, based on the port number in a received control packet. In the control session, when a control for controlling a parameter in the UI device as a client is operated, the parameter corresponding to this operation is operated in the DAW process as a server for which the control session is established with this UI device.

Note that the DAW processes DAW1 and DAW4, and the UI devices M2 and F1 are not registered in either of the workgroups, and thus none of the management session, interrupt session, and control session is established for them. However, the above DAW processes and the above UI devices are in a listening state (Listen state) for the sessions, and when they receive a connection instruction of a session, they can establish the instructed session.

Figure 7:
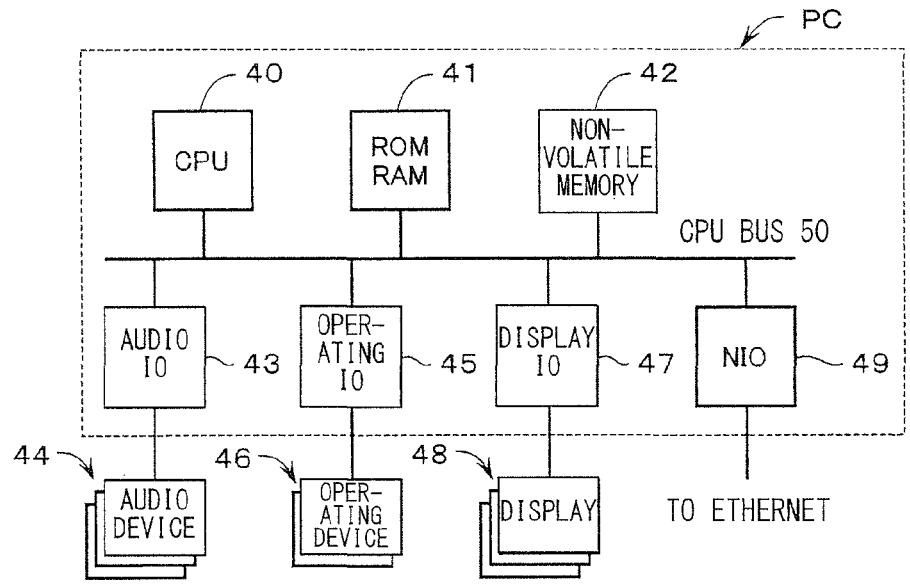
FIG. 7 is a block diagram illustrating a hardware structure of a PC in the music system control method of the embodiment of the invention.

Next, FIG. 7 illustrates a hardware structure of the personal computers (PC) PC1 to PC7 illustrated in FIG. 1.

As illustrated in FIG. 7, the PC is a general purpose computer, includes a CPU (Central Processing Unit) 40 executing an OS such as Windows (trademark), and includes a ROM/RAM 41 including a non-volatile ROM (Read Only Memory) storing software such as BIOS (Basic Input/Output System) executed when the PC is powered on, and a RAM (Random Access Memory) functioning as a work area for the CPU 40 and storing various data, and the like. Further, a non-volatile memory 42 is a rewritable non-volatile memory, such as a flash memory, storing software such as the management software and the DAW software executed by the CPU 40. Moreover, the PC includes an operating IO 45 to which operating devices 46 such as a keyboard and a mouse are connected, a display IO 47 to which one or more displays 48 are connected, and an audio IO 43 to which audio devices 44 such as a microphone, a CD player, a recorder, a headphone, an amplifier, and the like are connected. Moreover, there is provided an NIO (Network Input/Output Interface) 49 which is an Ethernet network adapter to which a LAN cable is connected. Each module is connected to a CPU bus 50, and the NIO 49 is connected to the network 2. Further, on the OS executed in the CPU 40, DAW processes such as Cubase (trademark), Nuendo (trademark), Protools (trademark), Sonar (trademark), and the like can be activated. Moreover, the management software process (GM) can be activated on the OS of the PC.

Figure 8:
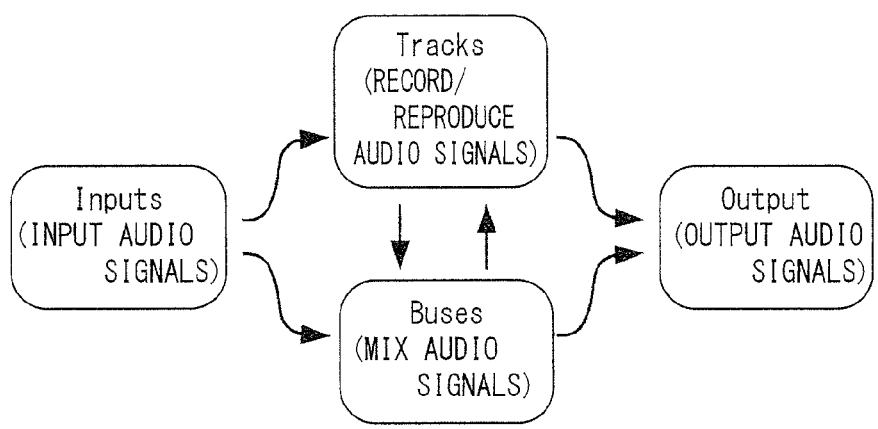
FIG. 8 is a block diagram illustrating a functional structure of a DAW process in the music system control method of the embodiment of the invention.

Next, FIG. 8 illustrates an example of a functional structure of the DAW process activated on the PC. The DAW process is a process activated on the OS such as Windows on the PC, and has a function to perform recording, mixing, mix down, and the like of an audio signal. Recording of an audio signal to each of tracks and reproduction of the recorded audio signal of each track can be controlled through a GUI (Graphical User Interface) of a track screen displayed on the display 48 of the PC. Further, each input channel, each track channel, each bus channel, and each output channel can be controlled through a GUI of a mixer screen displayed on the display 48 of the PC.

Each one of inputs illustrated in FIG. 8 to which an audio signal is inputted receives the audio signal from the outside via one input port of the audio IO 43, controls frequency characteristics, amplitude characteristics, and the like of the audio signal on the input channel, and supplies the audio signal to one track or bus. Further, each one of tracks illustrated in FIG. 8 which record/reproduce audio signals receives an audio signal from one input or bus, and records it in synchronization with a time code. In this case, adjustment of characteristics of the audio signal to be recorded is performed in this input or bus. The recorded audio signal is then reproduced in synchronization with the time code, frequency characteristics, amplitude characteristics, and the like of the audio signal are controlled on the track channel, and the controlled audio signal is supplied to one bus or output. Note that the time code indicates a current position (current time) on the time axis of various recording and reproduction functions, and is a common time for all tracks in one project.

Moreover, each one of buses illustrated in FIG. 8 which mix the audio signals receives audio signals from one or more inputs or tracks and mixes them. In this case, adjustment of characteristics of the audio signals to be mixed is performed on each input or track. Then, frequency characteristics, amplitude characteristics, and the like of an audio signal as a result of mixing are controlled on the bus channel, and the controlled audio signal is supplied to one track or output.

Furthermore, each one of outputs illustrated in FIG. 8 which output an audio signal receives audio signals from one or more tracks or buses and mixes them. Then, frequency characteristics, amplitude characteristics, and the like of an audio signal as a result of mixing are controlled on an output channel, and the controlled audio signal is outputted to the outside via one output port of the audio IO 43.

Next, FIG. 9 illustrates a block diagram of a hardware structure of the UI device 4. The UI device 4 is the fader controller 10 or the main controller 11 which is a physical controller, and both the controllers are of similar hardware structures.

The UI device 4 has a CPU (Central Processing Unit) 51 executing an OS such as Windows (trademark) as illustrated in FIG. 9, and includes a ROM/RAM 52 including a non-volatile ROM (Read Only Memory) storing software such as BIOS (Basic Input/Output System) executed when the UI device is powered on, and a RAM (Random Access Memory) functioning as a work area for the CPU 51 and storing various data, and the like. Further, a non-volatile memory 53 is a rewritable non-volatile memory, such as a flash memory, storing programs and the like for controller executed by the CPU 51, such as programs of "HB generation and transmission processing" (see FIG. 11), "main processing" (see FIG. 13), "processing upon B press" and "processing of relevant UI device" (see FIG. 17), "processing upon P operation" and "display update processing" (see FIG. 18), which will be described later. Moreover, the UI device 4 includes controls 54 such as knobs, faders, and buttons, a display 55 such as a liquid crystal display, and an NIO 56 which is an Ethernet network adapter to which a LAN cable is connected. Each module is connected to a CPU bus 57, and the NIO 56 is connected to the network 2. Note that plural types of UI devices including fader controllers (F1, F2, F3, . . . ) 10 and main controllers (M1, M2, . . . ) 11 are connected to the network 2. Further, one music system constituted of one workgroup can include one main controller at most and three fader controllers at most here.

Next, FIGS. 10A to 10F illustrate structures of Ethernet frames transmitted in the management session, the interrupt session, and the control session. FIG. 10A is a structure of an Ethernet frame (TCP) when a TCP (Transmission Control Protocol) is used as a protocol of a transport layer, and FIG. 10E is a structure of an Ethernet frame (UDP) when a UDP (User Datagram Protocol) is used as a protocol of a transport layer.

The Ethernet frame (TCP) illustrated in FIG. 10A includes an EN (Ethernet) header with 14 bytes, an IP (Internet Protocol) header with 20 bytes, a TCP header with 20 bytes, and a data body. The EN header includes a preamble indicating start of the frame, a destination MAC address, a source MAC address, protocol information (indicating an Internet protocol (IP) in this case) of an upper network layer of Ethernet (data link layer), a size, and the like. Further, the IP header includes a version, a header number, a service type, a packet length, an identifier, protocol information (TCP or UDP in this case) of an upper transport layer of IP (network layer), a checksum for detecting data error in the relevant header, a source IP address, a destination IP address, and the like. Moreover, the TCP header includes a source port number, a destination port number, a sequence number, an ACK number, various flags such as ACK, SYN, FIN, a window size, a checksum for detecting data error of the relevant header, and the like. In the TCP, a "sequence number" is defined, which indicates a byte position of head byte data to be included in the current TCP packet when the whole data to be sent is regarded as a byte data sequence, and alignment of data and window control are performed based on the sequence number. Further, the ACK number is information indicating to what byte position in the byte data sequence data are aligned by an already received series of TCP packets.

The data body transmitted on the Ethernet frame (TCP) is one of a management packet, a control packet, and an interrupt packet, and includes a header section and a message section. The management packet is transmitted in the management session and includes a management header, a management message, and a CRC code (Cyclic Redundancy Check) for error detection as indicated in FIG. 10B. The control packet is transmitted in the control session and includes a control header, a control message, and a CRC code as indicated in FIG. 10C. The interrupt packet is transmitted in the interrupt session and is constituted of an interrupt header, an interrupt message, and a CRC code as indicated in FIG. 10D. Based on data of the header section of the data body, a determination is made as to which of management, control and interrupt packets the data body is.

The Ethernet frame (UDP) illustrated in FIG. 10E includes an EN (Ethernet) header with 14 bytes, an IP (internet protocol) header with 20 bytes, a UDP header with 8 bytes, and a data body. The EN header and the IP header are as described above and hence their detailed descriptions are omitted. The UDP header includes a source port number, a destination port number, a size, a checksum for detecting data error in the relevant header, and the like.

The data body transmitted on the Ethernet frame (UDP) is a heartbeat (HB) packet, and the HB packet includes an HB header, an HB message, and a CRC code as indicated in FIG. 10F. Based on data of the BB header section of the data body, it is possible to determine that this data body is the HB packet. The HB message includes a model ID identifying type and version of a UI device or DAW, a unique ID identifying an individual UI device or DAW process, a system ID (meaning the same as the workgroup ID), a status flag indicating whether each of management, interrupt, and control sessions is established or not, a listening port number, and the like.

Note that the TCP is a connection type protocol which starts communication only upon a response from a communication partner, and a session is established before data transfer is performed. Further, the TCP includes various functions for more securely delivering data (segment) to the partner, such as three-way handshake, acknowledgement, flow control, congestion control, and the like. Compared to this TCP, the UDP is a protocol for performing data transfer without establishing a session, and does not include the above-described functions which the TCP includes. Thus, although low in reliability, the UDP has a high transfer rate and is suitable for one-to-many communication such as multicast and broadcast.

Figure 11:
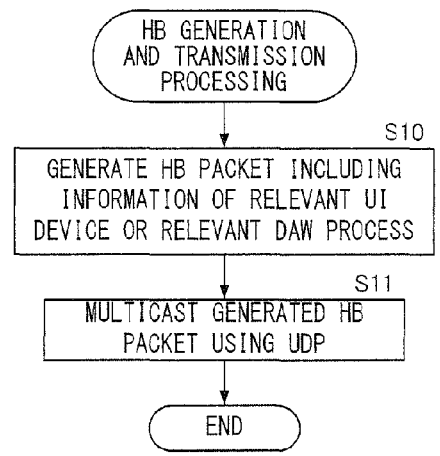
FIG. 11 is a flowchart of HB generation and transmission processing in the music system control method of the embodiment of the invention.

From all the UI devices and DAW processes on the network 2, at every predetermined cycle, the HB packet is multicasted so as to reach all the management software processes (GM) on the network 2. Here, FIG. 11 illustrates a flowchart of HB generation and transmission processing executed at every predetermined cycle by the CPU 51 in all the UI devices on the network 2 and the CPU 40 executing the DAW process, so as to describe the HB generation and transmission processing.

When it is judged that a timing to execute the HB generation and transmission processing is reached in either of the CPU 51 in the UI devices on the network 2 and the CPU 40 of the PC executing the DAW process, the CPU 51 or the CPU 40 starts the HB generation and transmission processing, creates the above-described HB message including information of the relevant UI device or the relevant DAW process, and generates an HB packet by adding an HB header to this HB message in step S10. Next, the CPU 51 or the CPU 40 generates an Ethernet frame (UDP) encapsulating the created HB packet and multicasts the frame in step S11, and then the HB generation and transmission processing ends. The destination IP address of the IP header in the Ethernet frame (UDP) in the case of performing this multicast is the IP address of a multicast group including plural PCs on which the management software process (GM) is running. The destination port number of the UDP header is one port number common to all the systems, all the UI devices, and all the DAW processes.

When the Ethernet frame (UDP) encapsulating the HB packet is received by each management software process (GM), the CPU 40 of the PC executing the management software process (GM) updates an FEB list stored in the ROM/RAM 41 with information of the HB message sent from each UI device or each DAW process and with the reception time. Thus, regarding all the HB messages which have been received, the HB list stores a latest reception time, an IP address of the source UI device or DAW process, a model ID, a unique ID, a system ID, a state flag, a listening port number and the like described in this HB message. Note that no unnecessary HB packet is sent to each UI device, and thus the processing load on each UI device can be reduced by that amount. However, an Ethernet frame (UDP) encapsulating the HB message can be broadcasted instead of multicasting.

Figure 12:
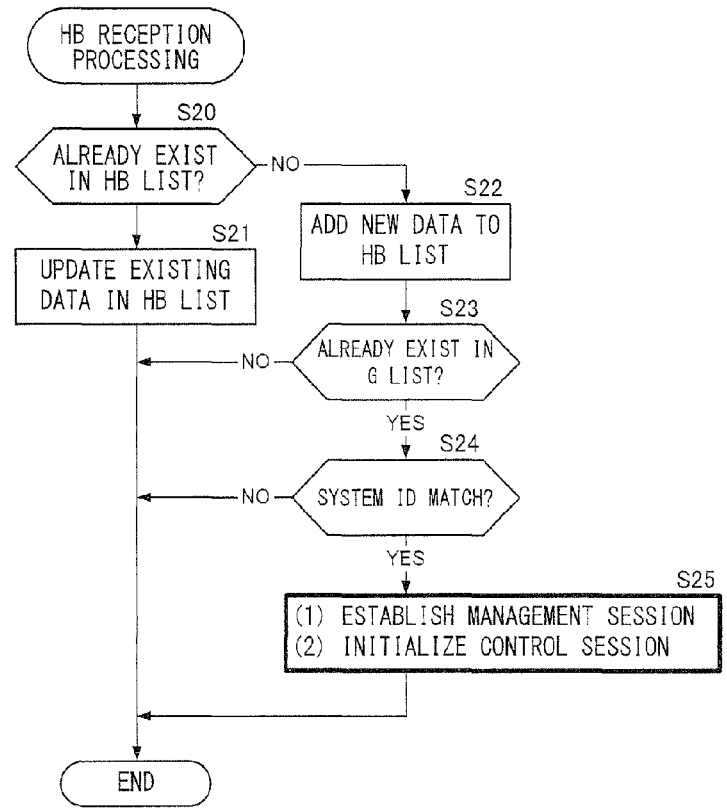
FIG. 12 is a flowchart of HB reception processing in the music system control method of the embodiment of the invention.

Now, FIG. 12 illustrates a flowchart of HB reception processing executed in the CPU 40 executing the management software process (GM) when the management software process (GM) receives the Ethernet frame (UDP) encapsulating the HB packet, so as to describe the HB reception processing. When the PC receives the Ethernet frame (UDP) encapsulating the HB packet which is sent from any one of the UI devices and the DAW processes on the network 2, the CPU 40 of this PC starts the HB reception processing as a part of the management software process (GM), and the CPU 40 judges in step S20 whether the UI device or DAW process identified with the HB message in the received Ethernet frame (UDP) already exists in the stored HB list or not. This judgment is made by detecting a match of unique ID between the HB message and the BB list, and when the CPU 40 judges in step S20 that the UI device or DAW process already exists in the stored HB list, the flow proceeds to step S21 to perform existing data update processing to update the reception time of the HB list with the time the Ethernet frame (UDP) is received this time, and update existing data of the HB list to latest data with the received HB message, and the HB reception processing ends.

Further, when the CPU 40 judges in step S20 that the UI device or DAW process does not exist in the stored HB list, the flow branches to step S22 and the CPU 40 additionally stores information of the UI device or DAW process identified with the HB message in the received Ethernet frame (UDP) as new data in the HB list. The information additionally stored is information of a time when the FIB packet is received, a model ID (model and version) and a unique ID described in the HB message, a system ID (workgroup ID) written into the HB message by the management software process (GM) when the management session is established, a communication state flag indicating whether each session is established or released and a listening port number which are also described in the HB message, and the like. Note that in the HB list stored in the ROM/RAM 41 of the PC executing the management software process (GM), while the HB packet is periodically received from the relevant UI device or DAW process, information related to this MB packet is stored. When the CPU 40 completes processing of step S22, the CPU 40 judges in step S23 whether the unique ID described in the HB message in the received Ethernet frame (UDP) already exists in a G-list or not. The G-list stored in the ROM/RAM 41 of the PC executing the management software process (GM) stores at least unique IDs of UI devices and DAWs registered in the music system (workgroup) managed by this management software process (GM). When the CPU 40 judges that the unique ID already exists in the G list, it is confirmed that the UI device or DAW process which sent the HB packet this time is a member of this music system, and the flow proceeds to step S24.

In step S24, the CPU 40 judges whether or not the system ID (workgroup ID) described in the HB message in the received Ethernet frame (UDP) matches the system ID of the music system (workgroup) managed by the management software process (GM). When the CPU 40 judges in step S24 that the system IDs match, it is the case where the newly found UI device or DAW process is a UI device or DAW process participating this music system, and this means that recognition of the UI device or DAW process which sent the HB message as a member of the music system is confirmed. Accordingly, the flow proceeds to step S25, and the CPU 40 executes (1) processing of establishing a management session and (2) initial setting processing of a control session. In the processing of establishing a management session, the CPU 40 establishes a management session with the port having the listening port number in the above-described information added to the HB list in step S22. In this case, if the communication state flag in the above-described information added to the HB list is the "flag indicating establishment of management session", the CPU 40 performs error processing (warning to the user, or the like) instead of the processing to establish a management session. At this time, if the GM screen 3 is displayed, the UI device or DAW process with which the management session is established in step S25 is displayed on the section 3a because it belongs to the workgroup.

Further, the initial setting processing of a control session is executed only when a new UI device or DAW process is found on the network 2, and the management session established in (1) is used to establish a control session with the relevant UI device or DAW process. Although details of this processing will be described later, first the CPU 40 sends a "listening request" to the DAW process, and then the CPU 40 sends an "establishing request" to the UI device. Here, a predetermined control session may be set, or information of immediately previous control session may be stored and set (reproduced). Now, the "predetermined control session" means a control session with a partner DAW process determined in advance, and examples of this partner DAW process determined in advance can include the first DAW process among plural DAW processes, the DAW process of the order corresponding to the number (the serial number added to each UI device when plural same UI devices are connected) of the relevant UI device, or the like. In this case, information of each DAW process found based on the HB packet is stored in current memory of the management software process (GM) together with a serial number added to the DAW process by the management software process (GM). This serial number is the "role" assigned to the DAW process or UI device when this DAW process or UI device is registered as a new member in this workgroup in the CPU processing of the above-described management software process (GM). Further, the "immediately previous control session" means a control session with the partner DAW process for which the control session is established immediately previously (but is now released) with the relevant UI device. In this case, the information identifying the partner DAW process is in the G list stored by the management software process (GM).

When the CPU 40 judges in step S23 that the unique ID does not exist in the G-list, or when the CPU 40 judges in step S24 that the system IDs do not match, it is the case where the newly found UI device or DAW process is a UI device or DAW process belonging to none of the music systems (workgroups) or belonging to another music system (workgroup). Accordingly, the UI device or DAW process which sent the HB message cannot be confirmed as a member of the music system (workgroup) managed by the management software process (GM), and thus the HB reception processing ends. At this time, if the GM screen 3 is displayed, the UI device or DAW process which cannot be confirmed as a member is displayed in the section 3b. Further, when the CPU 40 completes processing of step S25, the HB signal reception processing ends.

Note that the processing ends without doing anything when the system IDs do not match in step S24 in the HB reception processing. However, the user may be warned of finding of the UI device or DAW process having a different system ID, and moreover, an instruction to enter this UI device or DAW process in the relevant system may be accepted from the user, and processing similar to member addition processing (see FIG. 15), which will be described later, according to this instruction may be performed, to thereby incorporate the found UI device or DAW process again into the relevant system.

Figure 13:
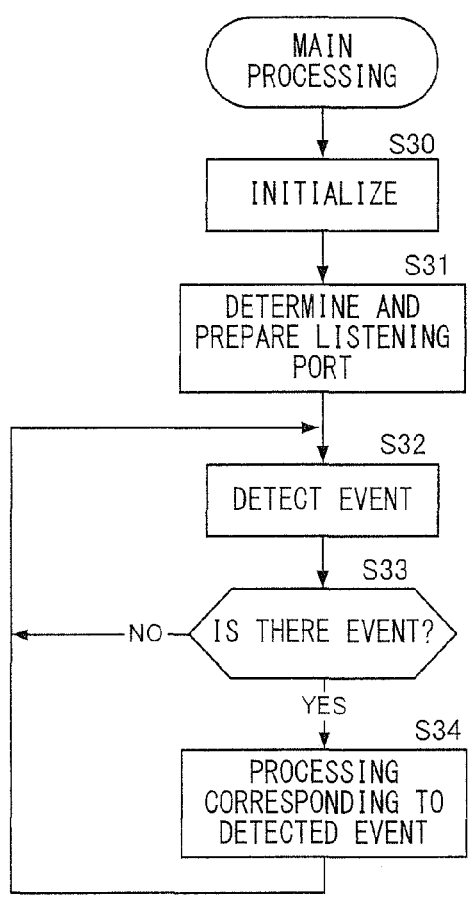
FIG. 13 is a flowchart of main processing in the music system control method of the embodiment of the invention.

Next, FIG. 13 illustrates a flowchart of main processing started when the UI device is powered on or the DAW process is activated on the PC, so as to describe the main processing.

When the UI device or DAW process is activated, the main processing is started in the CPU 51 in the activated UI device or the CPU 40 in the PC executing the DAW process, and the CPU 51 or the CPU 40 performs initialization processing in step S30. In the initialization processing, a work memory is initialized, and previous settings are read and set. Further, when the DAW process is activated, a project is read in, and the GM screen 3 illustrated in FIG. 3 is displayed on the display 48. Next, the CPU 51 or the CPU 40 determines one listening port number in step S31, and shifts to a state listening (Listen state) to the "management, session" and the "interrupt session" on the port with the listening port number. In this case, the "management session" and the "interrupt session" communicate less frequently than the "control session", and thus a port with the same listening port number is used for the "management session" and the "interrupt session". However, the listening port numbers may be different from each other for those types of sessions. In this case, when both the listening port numbers are described in the HB packet, any of the management software processes (GM) is able to establish the "management session" and the "interrupt session" with two ports with different port numbers from each other based on the HB packet.

Note that in one PC among the PC1 to PC7, plural applications such as plural DAW processes can be activated simultaneously, and respective different port numbers can be set to the applications. Then, when the plural DAW processes are activated on the PC, different listening port numbers are determined for the plural DAW processes respectively, and a listening communication path is prepared for each of the DAW processes. On the other hand, since only controller software is activated in the UI device, there is no restriction in the listening port number determined by the UI device, and an arbitrary listening port number can be determined. For example, it can be a predetermined port number common to all the UI devices.

When the processing of step S31 finishes, the flow proceeds to processing of step S32 to step S34. The processing of step S32 to step S34 is event driven processing and is in a listening state when the user is not operating a control, and processing corresponding to an event is performed when the user operates a control. Specifically, the CPU 51 or the CPU 40 performs detection of an event in step S32, and judges in step S33 whether there is an event or not. When the CPU 51 or the CPU 40 judges in step S33 that there is no event, the flow returns to step S32 to be in the listening state, and the processing of step S32 and step S33 is repeated. Then, when the user operates any one of the controls provided in the UI device or any one of the controls displayed on the display of the PC by the DAW process, it is detected in step S33 that there is an event regarding this control, the flow proceeds to step S34. The CPU 51 or the CPU 40 performs, in step S34, processing corresponding to the detected event, that is, how the control is operated. Further, when there occurs passage of the current time of DAW, expiration of a timer, operation of a mouse connected to the PC as the operating device 46, data reception from another apparatus, data reception from another process in the same apparatus, or the like, it is detected in step S33 that there is an event, and processing corresponding to the detected event is performed in step S34.

Figure 14:
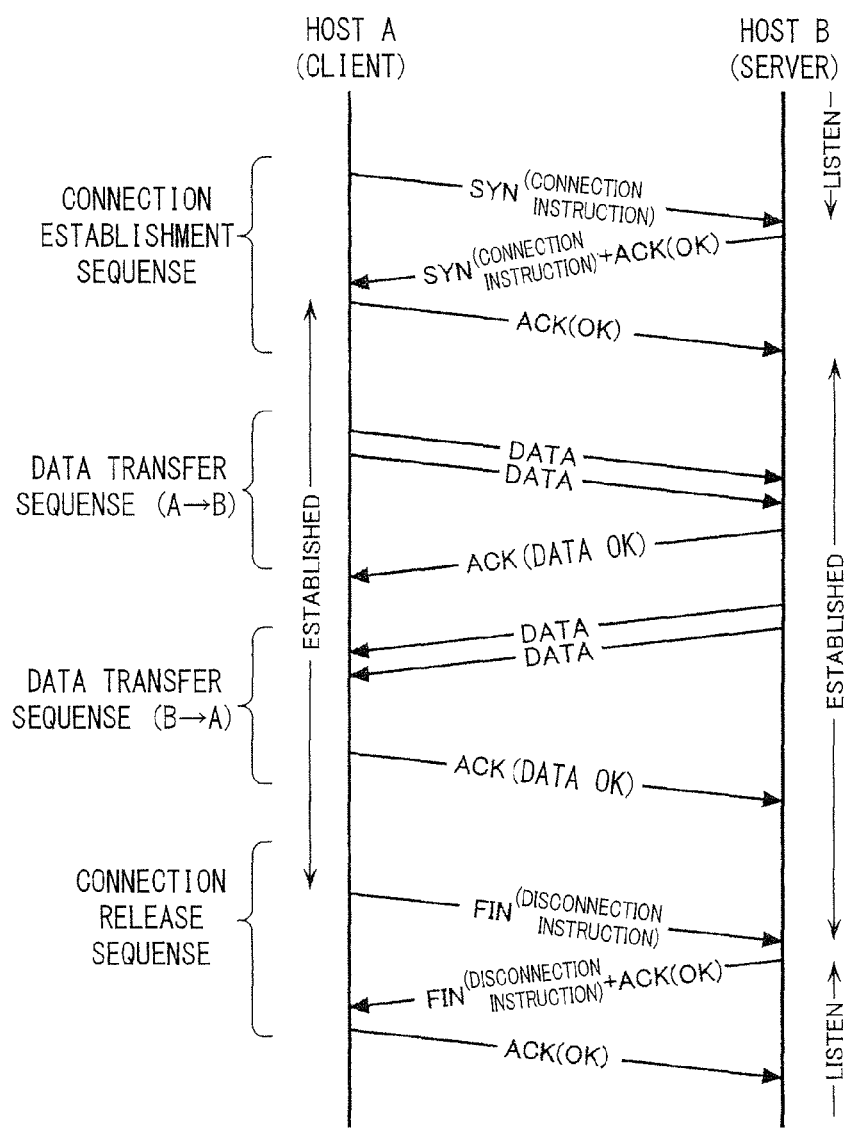
FIG. 14 is a sequence diagram illustrating a session establishment procedure, a data transmission procedure, and a release procedure in the music system control method of the embodiment of the invention.

Next, using FIG. 14, a procedure of establishment, data transfer, and release of a session common to the management session, the control session, and the interrupt session will be described. The establishment of a logical path in this procedure is in accordance with a standard procedure of establishment, data transfer, and release of connection in TCP.

When each of the sessions is established, a host A as a client sends an Ethernet frame (TCP) whose SYN (connection instruction) flag is "1" in the TCP packet to a host B as a server in a listening state (Listen) via the network 2. The destination IP address in this Ethernet frame (TCP) is an IP address assigned to the host B, and listening port number of the host B is set as the port number. When a session to be established is a management session or the interrupt session, the host A (client) is a PC executing a management software process (GM), and the host B (server) is a UI device or a PC executing a DAW process. The host A uses the IP address and the listening port number of the host B stored in the HB list to send SYN (connection instruction). The SYN (connection instruction) is sent by sending an Ethernet frame (TCP) whose SYN flag is "1".

Further, when a session to be established is a control session, the host A (client) is a UI device, and the host B (server) is a PC executing a DAW process. Which host A is to be connected with which host B is under control of a management software process (GM), and the host A uses the IP address and listening port number instructed from the CPU 40 executing the management software process (GM) to send the SYN (connection instruction).

Upon receiving the Ethernet frame (TCP) which is sent from the host A and whose SYN flag is "1", the host B performs connection establishment in response to the connection instruction from the host A, and transmits an Ethernet frame (TCP) which requests establishment of a session from the host B and whose SYN flag and ACK flag are "1" to the host A via the network 2. In response to this, the host A performs connection establishment, and sends an Ethernet frame (TCP) whose ACK flag is "1" to the host B via the network 2. Thus the session is established. This method of session establishment is called three-way handshake.

When the session is established, the host A can send data to the host B using this session, and host B can also send data to the host A. Note that since the amount of data which can be sent in the Ethernet frame (TCP) is limited to a predetermined amount, generally data is divided and sent in plural pieces. A state of sending such divided data is indicated by a "DATA" sequence from the host A toward the host B in the sequence diagram. As illustrated, when the host B normally receives all pieces of data divided into two pieces, the host B sends an Ethernet frame (TCP) whose ACK flag is "1" to the host A. Further, in the sequence diagram, when the host A normally receives all pieces of data divided into two pieces from the host B as indicated by a "DATA" sequence, the host A sends an Ethernet frame (TCP) whose ACK flag is "1" to the host B.

Then, when releasing the established session, an Ethernet frame (TCP) whose FIN (disconnection instruction) flag is "1" is sent to the partner host via the network 2. In the illustrated case, the host A sends an Ethernet frame (TCP) whose FIN (disconnection instruction) flag is "1" to the host B via the network 2. Upon receiving the Ethernet frame (TCP) whose FIN flag is "1" sent from the host A, the host B performs connection release in response to the disconnection instruction from the host A, and sends an Ethernet frame (TCP) which requests release of the session from the host B and whose FIN flag and ACK flag are "1" to the host A via the network 2. The host A performs connection release in response to this, and sends an Ethernet frame (TCP) whose ACK flag is "1" to the host B via the network 2. Thus the session is released. This causes the session in the host B to change from the established state (ESTABLISHED) to the listening state (Listen).

Note that in the establishment sequence of the session, if the ACK is not returned in a predetermined time, or if an ACK indicating that the server is not in the listening state (NACK: Negative ACKnowledgement) is sent from the server, the session cannot be established. Further, when a state of no access to sessions continues for a predetermined time or longer, a timer expires and the sessions are automatically released. Accordingly, in this embodiment of the music system control method, regarding the management session and the control session, just before a time for not performing data transmission runs out, dummy data (Keepalive packet) for continuing these sessions are sent. Thus, once the management session and the control session are established, they are continued until the music system is shut down.

The management software process (GM) displays the GM screen 3 illustrated in FIG. 3 on the display 48 of the PC based on data of the HB list. The HB list is updated every time the HB reception processing of FIG. 12 is executed, and thus the latest UI device and DAW process existing on the network 2 are displayed on the GM screen 3. In the "Outside" section 3b of the GM screen 3, when the user selects one desired UI device or DAW process (hereinafter referred to as a "target D") and operates the left arrow button 3c ("←"), selection of the target D is accepted, and the CPU 40 of the PC executing the management software process GM executes member addition processing of the flowchart illustrated in FIG. 15. This member addition processing will be described below. Note that operation of "add (←)" and "delete (→)" in the GM screen 3 illustrated in FIG. 3 is not allowed to a general user of the system, and is allowed only to an administrator of the system.

In the GM screen 3, when the left arrow button 3c ("←") is operated, the CPU 40 of the PC executing the management software process GM starts the member addition processing. The CPU 40 refers the HB list stored in the ROM/RAM 41 of the PC executing the management software process (GM) in step S40, and reads out information which was described in the HB message of the target D selected in the "Outside" section 3b of the GM screen 3. Then, the CPU 40 judges in step S41 whether a system ID other than that of the music system (workgroup) managed by the management software process executing the member addition processing exists in the HB message of the target D or not.

When the CPU 40 judges in step S41 that there is no other system IDs, the flow proceeds to step S42 because the target D is not registered in any music system (workgroup). In step S42, the CPU 40 establishes a management session with the target D, and writes the system ID of the music system managed by the management software process into the target D via the management session. Next, the CPU 40 performs initialization setting processing of a control session in step S43. When this initialization setting processing is performed, the CPU 40 establishes a control session with the UI device controlling the target D or the DAW process controlled by the target D using the management session established in step S42. Then, the CPU 40 erases the target D selected in the "Outside" section 3b in the GM screen 3 in step S44, and displays the target D on the "Workgroup" section 3a. Then, the member addition processing ends.

Further, when the CPU 40 judges in step S41 that there is another system ID, that is, when the target D belongs to another system, the target D is registered as a member in another management software process (GM'), and a management session is established between this management software process and the target D. Thus, the flow branches to step S45, and the CPU 40 establishes an interrupt session with the target D using the listening port number written on the read HB list. In this case, when the target D is in an interrupt session with the above another management software process (GM'), the CPU 40 performs the establishment after the interrupt session finishes. However, when the waiting time is too long, the CPU 40 warn the user of this matter. Then, the CPU 40 performs negotiation to incorporate the target D into the music system (workgroup) managed by the management software process in step S46 using the established interrupt session. Then, when the negotiation succeeds, in order to exclude the target D from the music system (workgroup) to which the target D currently belongs, the target D requests release of the management session to the above another management software process (GM') using the existing management session, and the management software process (GM') releases the management session in response to this release request. The negotiation here may be such that, for example, it succeeds when the user logged on to the relevant management software process (GM) is registered (authorized) in the above another management software process (GM'), or fails when it is not. Alternatively, the negotiation may be such that it succeeds when "prohibition of interception" is not set on the target D, or fails when it is set thereon. Further alternatively, since the user allowed to execute the member addition processing is limited to the administrator as described already, the negotiation regarding step S46 may be such that it unconditionally (always) succeeds.

Next, the CPU 40 releases the interrupt session established in step S45, in step S47. When the processing to release the interrupt session finishes, the CPU 40 judges in step S48 whether the management session requested to the above another management software process (GM') is released or not. Here, when the CPU 40 judges that the management session is released with reference to the flag indicating the state of the management session of the target D, the CPU 40 performs the above-described processing of step S42 to step S44, so as to add the target D to members of the music system managed by the management software process (GM) executing the member addition processing. Further, when the CPU 40 judges in step S48 that the management session is not released, the target D is still a member of the music system managed by the other management software process (GM'), and it is not possible to add the target D as a member of the music system managed by the management software process (GM). Thus, the flow proceeds to step S49 and the CPU 40 warns the user that interception is not possible by displaying the matter on the display 48 of the PC, or the like. When processing of step S44 or step S49 is completed, the member addition processing ends.

Note that it may be configured to allow selecting and adding plural targets D simultaneously on the GM screen 3. In this case, the above-described processing is performed for every one of the selected plural targets D.

Figure 16:
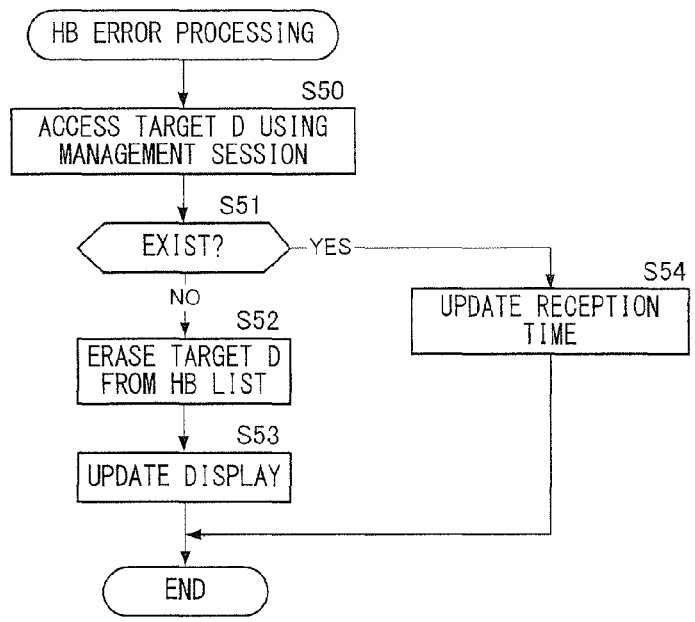
FIG. 16 is a flowchart of HB error processing in the music system control method of the embodiment of the invention.

The management software process (GM) monitors the reception time of the HB message in the stored HB list. FIG. 16 illustrates a flowchart of HB error processing executed by the CPU 40 of the PC executing the management software process (GM) when a predetermined time passes without the reception time being updated, that is, the HB packet from a UI device or DAW process whose data are in the HB list (hereinafter referred to as a "target D") is not received for a predetermined time, so as to describe the HB error processing.

When it is detected that an elapsed time from the reception time of the HB message exceeds a predetermined time for any one of targets D on the HB list stored by the management software process (GM), the CPU 40 of the PC executing the management software process (GM) starts the HB error processing, and accesses the relevant target D using the management session in step S50. Through this access, for example, the CPU 40 sends an Ethernet frame (TCP) with an empty data body to the target D. Then, the CPU 40 confirms whether an Ethernet frame (TCP) with the ACK flag of "1" is returned from the target D or not. When this Ethernet frame (TCP) is returned, it means that the target D exists in the music system (workgroup) managed by the management software process (GM), and thus the CPU 40 judges in step S51 that the target D exists and the flow branches to S54. In step S54, the CPU 40 updates the reception time from the target D on the HB list to the current time, and the HB error processing ends.

Further, when the above-described Ethernet frame (TCP) is not returned from the target D, it means that the target D does not exist in the music system (workgroup) managed by the management software process (GM). In this case, the CPU 40 judges in step S51 that the target D does not exist and the flow proceeds to step S52, and the CPU 40 erases the target D from the HB list stored by the management software process (GM). Then, the CPU 40 erases the target D from the "Workgroup" section 3a on the GM screen 3 in step S53. Then, the HB error processing ends. Through the above-described processing of steps S23 to S25 and step S53, the sections 3a, 3b are controlled to display only the HB devices and the DAW processes which are currently confirmed to exist by reception of the HB message, and not to display the UI devices and the DAW processes for which the HB message is not received.

Figure 17:
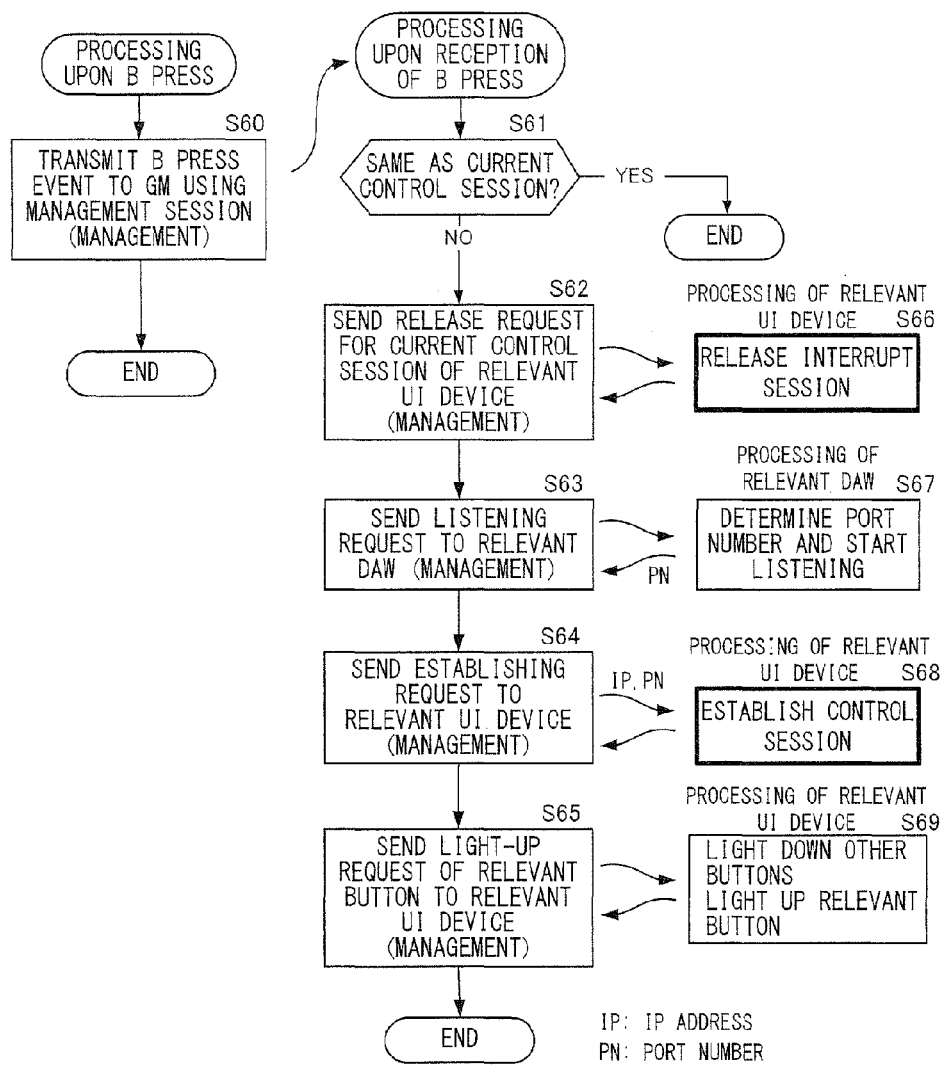
FIG. 17 is a flowchart of processing executed in the UI device and a group manager when a select button of DAW is operated in the music system control method of the embodiment of the invention.

In the embodiment of the music system control method, when the select button for selecting a DAW process controlled by a UI device is operated on the UI device, a series of processing is performed in the UI device and in a management software process (GM) managing the music system in which the UI device is a member, thereby enabling control of the selected DAW process by the UI device. FIG. 17 illustrates a flowchart of processing upon B (button) press which is performed in the CPU 51 in the UI device at that time and processing upon reception of B press, which is performed in the CPU 40 of the PC executing the management software process (GM) managing the music system in which the relevant UI device is a member, so as to describe the series of processing.

When one of the select buttons 26 in the fader controller 10 as a UI device is operated, or when one of the select buttons 31 in the main controller 11 is operated, the CPU 51 in the UI device on which the select button is operated starts the processing upon B press, and in step S60 the CPU 51 sends information about which DAW process is selected by operation of the select button, using the management session, to the management software process (GM) managing the music system in which the relevant UI device is a member. Then, the processing upon B press ends, and when the above information is received by the management software process (GM) managing the music system in which the relevant UI device is a member, the management software process (GM) accepts the selection of the DAW process, and the CPU 40 of the PC executing this management software process (GM) starts the processing upon reception of B press.

When the processing upon reception of B press is started, the CPU 40 judges in step S61 whether or not the selected DAW process is the same as the partner DAW process of the current control session established in the relevant UI device. Here, when the CPU 40 judges to be the same, the current setting need not be changed and hence the processing upon reception of B press ends. On the other hand, when the CPU 40 judges not to be the same, the flow proceeds to step S62. In step. S62, the CPU 40 of the PC executing the management software process (GM) sends a release request of the current control session to the relevant UI device using the management session. Upon receiving the release request of the current control session, the relevant UI device sends, using the current control session, a disconnection instruction (FIN) to the PC executing a DAW process as the connection destination, and thereby the current control session is released following the procedure illustrated in FIG. 14. Then, after confirming the release, the relevant UI device sends, using the management session, a release acknowledgement notifying completion of release of the current control session to the PC executing the management software process (GM) (step S66). Upon reception of the release acknowledgement, the CPU 40 of the PC executing the management software process (GM) sends, using the management session, a listening request for a new control session to the PC executing the DAW process selected on the relevant UI device (step S63). In step S67, the PC executing the relevant DAW process determines one port number as a listening port number, and moreover, starts server operation using the one port number. Specifically, the PC executing the relevant DAW process receives the listening request, determines a non-used port number as the listening port number in this PC, starts the listening operation as a server to the control session on the port indicated by the listening port number, and sends, using the management session, a listening acknowledgement in which the listening port number is written to the PC executing the management software process (GM).

Upon receiving the listening acknowledgement, the CPU 40 of the PC (management software process (GM)) sends to the relevant UI device a control session establishing request including information of the IP address of the PC executing the DAW process and the listening port number described in the listening acknowledgement via the management session (step S64). Upon receiving the control session establishing request, the relevant UI device sends a connection instruction (SYN) of the control session to a port, of the port number described in the request, of the PC of the IP address likewise described therein, and thereby a control session with the DAW process of the PC is established following the procedure illustrated in FIG. 14. Then, after confirming the establishment, the relevant UI device sends, using the management session, an establishment acknowledgement notifying completion of establishment of the control session to the PC executing the management software process (GM) (step S68). Here, when the processing of all steps S66 to S68 succeeds and the control session between the relevant UI device and the selected DAW process is established, the CPU 40 executing the management software process (GM) sends a light-up request of the operated select button of the relevant UI device via the management session (step S65). Upon receiving the light-up request, the relevant UI device lights down the select button which has been lit before the selection, lights up the selected select button, and sends a notification of light up of the selected select button to the management software process (GM) (step S69). The CPU 40 executing the management software process (GM) ends the processing upon reception of B press, after confirming that the notification of light up of the select button is returned. Further, when the processing of any of steps S66 to S68 fails, the CPU 40 performs error display indicating occurrence of error on the display device of the PC executing the management software process (GM).

Figure 18:
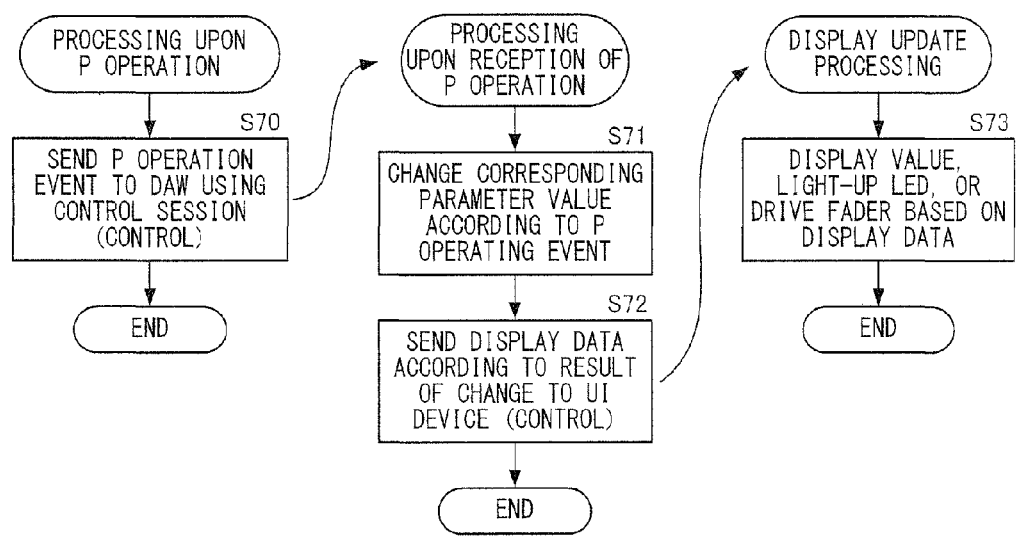
FIG. 18 is a flowchart of processing executed in the UI device and DAW when a control regarding a parameter is operated in the music system control method of the embodiment of the invention.

As described above, a UI device is connected to one of the DAW processes via the control session, and by operating a control provided on the UI device, the series of processing is performed to enable operation of a parameter of the connected DAW process. FIG. 18 illustrates a flowchart of processing upon P (parameter) operation and display update processing performed in the CPU 51 in the UI device at that time, and P operation reception processing performed in the CPU 40 of the PC executing the DAW process controlled by the relevant UI device, so as to describe the series of processing.

When one of the controls provided on the UI device is operated, the CPU 51 in this UI device starts the processing upon P operation, and the CPU 51 sends, using the control session, a P (parameter) operating event of the operated control to the DAW process connected with UI device in step S70. The processing upon P operation ends here. However, upon receiving the P operating event, the CPU 40 of the PC executing the DAW process starts the processing upon reception of P operation, and changes the corresponding parameter value in step S71 according to the P operating event. Next, in step S72, the CPU 40 sends display data according to the result of changing the parameter value to the UI device using the control session. The processing upon reception of P operation ends here. Upon receiving the display data, the CPU 51 in the UI device starts display update processing, and displays the value of the parameter, lights up an LED when the operated control is a button, or drives the fader 21 when the operated parameter is a fader level, based on the display data in step S73. The display update processing ends here.

Note that target parameters which can be operated on the UI device include open or close of various screens displayed on the display 48 of the PC on which the DAW process is activated, and setting of a position on a time axis of audio data, start and stop of recording, start and stop of reproduction, and the like regarding tracks, and parameter settings of each input channel, each track channel, each bus channel, and each output channel regarding the mixer screen, and a fader value, ON/OFF, send level value, equalizer settings, compressor settings, and the like regarding each channel. Moreover, operation of setting of a plug-in effect inserted in each channel is also included.

INDUSTRIAL APPLICABILITY

In the music system control method according to the invention as has been described above, a management software process first establishes a management connection with a selected music software process and a controller on the network. Then, the management software process establishes a control connection between each controller and a desired music software process via this management connection. Then, remote control of the music software process by the controller is performed via the control connection. In the music system control method according to the invention, regarding the UI device or DAW process belonging to another music system, what music system it belongs to may be displayed on the GM screen 3 illustrated in FIG. 3 so that the user can recognize the music system.

Further, although the above-described music system includes the DAW process and the UI device, the music system control method according to the invention may be applied to a system including a mixer engine and a UI device, a system including a tone generator and a UI device, or the like. In this case, the management software process (GM) may be activated on a separately prepared PC, or be activated in the CPU of the mixer engine or the tone generator. Further, the user can remotely control the mixer engine, the tone generator, or the like with the UI device.

Note that in the music system control method according to the invention, whether the type of each session is the management session or the control session is distinguished by each of the management software process, the DAW (music software) process, and the UI device (controller) in each session established in itself. When a packet is sent via a session, the packet corresponding to the type of the session is formed and sent by each process of device. In the music system control method according to the invention, all of the sessions are a TCP connection, and the difference in type here is a difference in packets that flow.

Further, in the music system control method according to the invention, the network technology standard is not limited to Ethernet, and a different network technology standard may be employed. In this case, data structures of frames and packets according to the employed network technology standard are used. Moreover, the panel structures of the controllers are examples, and the controls may include a rotary encoder and the like, and a control of desired type or the like can be disposed at any position. Furthermore, on the controllers, controls on a UI screen displayed on a display may be employed instead of the physical controls, and for example, a tablet terminal on which controller software is installed may be employed as the controllers. Furthermore, the hardware structures of the PC and the UI device are examples and not limited to the illustrated structures.

REFERENCE SIGNS LIST

1 . . . music system, 2 . . . network, 3 . . . GM screen, 3a . . . "Workgroup" section, 3b . . . "Outside" section, 3c . . . left arrow button, 3d . . . right arrow button, 4 . . . UI device, 10 . . . fader controller, 11 . . . main controller, 20a . . . channel strip section, 20b . . . control section, 21 . . . fader, 22 . . . channel name display section, 23 . . . knob, 24 . . . first controls, 25 . . . second controls, 26 . . . select buttons, 26a to 26c . . . button, 31 . . . select buttons, 31a to 31c . . . button, 40 . . . CPU, 41 . . . ROM/RAM, 42 . . . non-volatile memory, 43 . . . audio IO, 44 . . . audio device, 45 . . . operating IO, 46 . . . operation device, 47 . . . display IO, 48 . . . display, 49 . . . NIO, 50 . . . CPU bus, 51 . . . CPU, 52 . . . ROM/RAM, 53 . . . non-volatile memory, 54 . . . controls, 55 . . . display, 56 . . . NIO, 57 . . . CPU bus, DAW . . . music software, GM . . . management software process, PC1 to PC7 . . . personal computer, M1 to M3 . . . main controller, F1 to F5 . . . fader controller

The invention claimed is:

1. A music system control method for controlling a plurality of devices and a plurality of music software processes connected one another via a network so as to make some of the devices and some of the music software processes operate as one music system of a plurality of music systems operating on the network, comprising:
- a first step of receiving heartbeat signals regularly transmitted from each of the plurality of devices and the plurality of music software processes by broadcast or multicast, each heartbeat signal including a unique identifier of a corresponding device or a music software process, identification information of a music system of the plurality of music systems to which each of the plurality of devices or the plurality of music software processes which sent the heartbeat signals belongs to;
- a second step of presenting, based on the heartbeat signals received in the first step, each of the plurality of devices and the plurality of music software processes which sent the heartbeat signals such that it is possible for a user to differentiate which of the plurality of devices and the plurality of music software processes belong to any of the plurality of music systems and which do not belong to any of the plurality of music systems;
- a third step of accepting, from a user, selection of a device or music software process among the plurality of devices or the plurality of music software processes not belonging to any music system presented in the second step, and registering the selected device or music software process as a device or music software process belonging to the one music system; and
- a fourth step of accepting, from a user, operation to the one music system, and controlling the device or music software process belonging to the one music system according to the accepted operation.

2. The music system managing method according to claim 1, wherein the heartbeat signals regularly transmitted from each of the plurality of devices and the plurality of music software processes by broadcast or multicast include a port number for communicating with each of the plurality of devices and the plurality of music software processes which sent the heartbeat signals, and
the controlling in the fourth step is remote controlling through communication with the device or music software process belonging to the one music system using the port number included in the heartbeat signal transmitted from the device or the music software process.

3. The music system managing method according to claim 1, wherein the heartbeat signals regularly transmitted from each of the plurality of devices and the plurality of music software processes by broadcast or multicast include the identification information of the music system which the devices or music software processes which sent the heartbeat signals belong to, and a status data indicating whether a remote control is active or inactive regarding the music system, and
the presenting in the second step is presenting, based on the identification information of the music system and the status data included in the heartbeat signals received in the first step, each of the plurality of devices and the plurality of music software processes which sent the heartbeat signals.

4. A music system control method for controlling a plurality of devices and a plurality of music software processes connected one another via a network so as to make some of the devices and some of the music software processes operate as one music system, of a plurality of music systems operating on the network, comprising:
- a first step of receiving heartbeat signals regularly transmitted from each of the plurality of devices and the plurality of music software processes by broadcast or multicast, each heartbeat signal including a unique identifier of a corresponding device or a music software process, identification information of a music system of the plurality of music systems to which each of the plurality of devices or the plurality of music software processes which sent the heartbeat signals belongs to;
- a second step of presenting, based on the heartbeat signals received in the first step, each of the plurality of devices and the plurality of music software processes which sent the heartbeat signals such that it is possible for a user to differentiate which of the plurality of devices and the plurality of music software processes belong to the one music system and which belong to another music system;
- a third step of accepting, from a user, selection of a device or music software process among the plurality of devices or the plurality of music software processes belonging to another music system presented in the second step, intercepting the selected device or music software process from the another music system, and registering the selected device or music software process as a device or music software process belonging to the one music system; and
- a fourth step of accepting, from a user, operation to the one music system, and controlling the device or music software process belonging to the one music system according to the accepted operation.

* * * * *